United States Patent Office 3,419,478
Patented Dec. 31, 1968

3,419,478
AZEOTROPIC DISTILLATION OF A N,N-DIMETHYLACETAMIDE-ACETIC ACID MIXTURE USING A SATURATED ALIPHATIC HYDROCARBON
Emmette F. Izard, Kenmore, N.Y., assignor to E. I. du Pont de Nemours and Company, Wilmington, Del., a corporation of Delaware
No Drawing. Filed Dec. 13, 1966, Ser. No. 601,355
5 Claims. (Cl. 203—70)

ABSTRACT OF THE DISCLOSURE

Mixtures of N,N-dimethylacetamide (DMAC) and acetic acid are separated by azeotropic distillation using certain aliphatic hydrocarbons, such as nonane.

Background of the invention.—N,N-dimethylacetamide is a valuable chemical product finding utility in, for example, the spinning of synthetic filaments. It frequently is available in admixture with acetic acid. Such mixtures cannot be readily separated by simple distillation because these two compounds form an azeotrope.

One way of resolving such a mixture is by azeotropic distillation and a process of that type is disclosed in the U.S. patent to Freure, No. 2,953,503. The added material for the azeotropic distillation in the Freure patent is a derivative of benzene, such as chlorobenzene, xylene or the like.

Summary of the present invention.—In the present invention acetic acid and N,N-dimethylacetamide (DMAC) are separated by azeotropic distillation using certain aliphatic hydrocarbons as the material that selectively azeotropes with one of the components, or specifically with acetic acid. Upon fractionally distilling such a mixture, the acetic acid azeotropes with the hydrocarbon and distills away from the DMAC, the latter generally being recovered as a still pot or bottoms product, or in a subsequent distillation step.

The hydrocarbons used in the present invention are saturated, aliphatic hydrocarbons containing at least six carbon atoms in their chain, and preferably containing a total of eight to nine carbon atoms. Representative compounds that can be used are n-octane, 2-methyloctane, n-nonane and 2,5-dimethylhexane. These hydrocarbons are miscible with DMAC and with acetic acid when hot, but at about room temperature they are substantially immiscible with those compounds. Advantage is taken of those facts to provide unique and effective recovery of the hydrocarbon employed. The distillate obtained is cooled so that two liquid phases are formed, the upper being the hydrocarbon and the lower being acetic acid. Similarly the bottoms product or the residue from the azeotropic distillation can be cooled to cause the formation of two layers, the upper being the hydrocarbon and the lower being DMAC. In this simple manner (especially as to the distillate) the added hydrocarbon is promptly recovered and can be recycled for further use. This limits the need for a large inventory of the hydrocarbon and substantially eliminates need for expensive recovery equipment.

The azeotropic composition of DMAC and acetic acid is pressure dependent. The azeotrope as such can be used as a feed material in practicing this invention or mixtures of these compounds in which either is in excess of the azeotropic composition at the pressure of operation can be employed. The quantity of hydrocarbon used to resolve that mixture is not critical. As noted, the hydrocarbon azeotropes with the acetic acid and the addition of any quantity of the hydrocarbon will make it possible to remove some of the acid. However, it is preferred to use about ½ to 2½ parts, by weight, of the hydrocarbon per part by weight of the mixture of DMAC and acetic acid to be treated according to this invention. Larger or smaller relative quantities of the hydrocarbon could as well be used.

Azeotropic distillation in the present process can be carried out in batch or continuous distillation equipment. For batch operations, a still pot fitted with a column and a condenser for the vapors can be used. Upon the distillation of all the hydrocarbon used plus acetic acid that azeotropes with it, the residue is enriched with respect to DMAC, which can at least in part be recovered by another distillation. For continuous operations a plurality of fractionating columns suitably are employed, and the feed mixture generally is added at an intermediate portion of the column. A flow diagram of such a typical continuous operation is set forth in the accompanying drawing. In such continuous operations the hydrocarbon, DMAC and acetic acid mixture is fed to the first distillation column and distilled. The vapors or overhead product is condensed and then cooled to cause the phase separation. The lower phase or layer is substantially acetic acid, or at least is rich in acetic acid and is recovered. The upper phase is the hydrocarbon rich layer and this is recycled to the feed inlet line to that column. A product is continuously withdrawn from the bottom of the column and passed to a first separator where it is cooled to cause two phases to separate. The upper phase or layer is the hydrocarbon rich layer and this also is recycled to the feed line of the first fractionating column. The bottom layer is a DMAC rich layer but generally will contain some acetic acid and some hydrocarbons. This can be used as the feed mixture to a second fractionating column operated similarly to the first mentioned column. In the second column, the overhead product is composed largely of the hydrocarbon plus small amounts of the acetic acid and perhaps trace amounts of the DMAC. This can be cycled to the feed line of the first fractionating column. The bottoms from the second fractionating column comprises essentially DMAC and a minor amount of acetic acid and this is used as the feed to a third column. The third column is operated to produce pure DMAC as the overhead and a composition, as bottoms, approaching that of the azeotrope of DMAC and acetic acid at the pressure of operation. This azeotrope is returned to the feed line of the first column for further resolution by the system defined.

The usual considerations in distillation are taken into account in the practice of the present invention. For example, the materials of construction of the columns and associated equipment are chosen with a view to avoiding interaction with any of the compounds present. Any manner of heat input, any number of column plates from a few to 10 to 30 or more, column packing, condenser operation and the like can be used, where appropriate, for the present distillation, and such details form no part of the present invention. For details of that nature, reference can be made to standard sources on distillation operations.

The invention will be described further in conjunction with the following examples.

Example I

A mixture of 250 grams of n-nonane, 175 grams of DMAC and 75 grams of acetic acid was placed in a still pot having a packed column attached to it. The mixture was gently heated and slowly distilled through the fractionating column. At a still pot temperature of 150° C., a first fraction was collected at a vapor temperature of 111° to 119ö C. and condensed. Upon cooling to ambient temperature, the condensate separated into two layers. The upper layer was almost pure nonane and the lower layer analyzed to be 85.8 weight percent acetic acid, 1.5 weight percent DMAC and the balance nonane. A second fraction was collected at the vapor temperature of 119 to 134° C. Upon cooling, it separated into two layers, and the lower layer analyzed to contain 79.2 weight percent acetic acid, 17.6 percent DMAC and the balance nonane.

This demonstrated that a fraction of nonane and acetic acid with but minimal DMAC could be removed from the mixture by azeotropic distillation, thereby enriching the residue in DMAC content.

Example II

A mixture of 390 grams of n-nonane, 140 grams of DMAC and 60 grams of acetic acid was slowly distilled through a packed fractionating column at a still pot temperature of 138° to 144° C. A first fraction was collected at a vapor temperature of 108° to 120° C. Upon cooling, the distillate separated into two layers, and the lower layer analyzed to contain, by weight, 87.3% acetic acid, 1.3% DMAC and the balance nonane.

At a still pot temperature of 140° to 145° C. a second fraction was collected at a vapor temperature of 120° to 136° C. This distillate separated into two layers upon cooling, and the lower layer analyzed to contain, by weight, 74.0% acetic acid, 19.6% DMAC and the balance nonane. In view of the high DMAC content in this fraction, it was evident that a vapor range below 120° to 136° C. had to be used to limit DMAC entrainment.

The residual liquid remaining in the still pot upon cooling also separated into two layers. The upper layer was largely nonane, and the lower layer analyzed to be, by weight, 76.4% DMAC, 11.4% acetic acid and the balance nonane.

Example III

The upper or nonane layers from the two distillate fractions of Example II were added to 140 grams of DMAC and 60 grams of acetic acid and distilled as before. A fraction collected at a vapor temperature of 109° to 129° C. separated, upon cooling, into two layers, and the lower layer analyzed to be, by weight, 86.9% acetic acid, 2.2% DMAC and the balance nonane. When the residual liquid remaining in the still pot was allowed to cool, it separated into two layers and the lower layer analyzed to be, by weight, 69.6% DMAC, 17.3% acetic acid and the balance nonane.

The upper layer recovered from the 109° to 129° C. distillate was again added to a mixture of 140 grams of DMAC and 60 grams of acetic acid, and this mixture was distilled as before. A fraction collected at a vapor temperature of 105° to 121° C. upon cooling separated into two layers, and the lower layer was found to contain, by weight, 85.1% acetic acid, 1.4% DMAC and the balance nonane.

The residual liquid remaining in the still pot amounted to 182 grams. Upon cooling to 3° C. it separated into two phases, 8 ml. of an upper, nonone-rich phase and the lower phase which amounted to 175.6 grams. The lower phase was analyzed and found to contain, by weights, 72.7% DMAC, 17.6% acetic acid and the balance nonane.

Example IV

A mixture of 350 grams of n-nonane, 350 grams of DMAC and 150 grams of acetic acid was placed in a two-liter still pot under a fractionating column packed with glass helices, which in turn was surmounted by a reflux condenser, a product cooler and a phase separator adapted to return the upper (nonane-rich) layer back to the fractionating column. At a still pot temperature of 146° to 148° C. distillation took place, and a fraction was collected at a vapor temperature of 110° to 125° C. (The nonane/acetic acid azeotrope boils, at atmospheric pressure, at 112.6° C. and contains about 69.6 weight percent of acetic acid and the remainder nonane.) The cooled distillate separated into two layers and the upper, nonane-rich layer was continuously returned to the fractionating column. The lower layer of the distillate amounted to 77 grams, and by weight analysis was found to contain 85.2% acetic acid, 3.0% DMAC and the balance nonane.

The residual liquid in the still pot upon cooling also separated into two layers. The lower layer by analysis was found to contain, by weight, 71.9% DMAC, 13.4% acetic acid and the balance nonane. This lower layer was placed in a 1-liter still pot under a fractionating column packed with glass helices, and distilled at a pressure of 136 mm. of mercury and a pot temperature of 113° to 128° C. Distillate in an amount of 70 ml. was collected at a vapor temperature of 94° to 115° C. The distillate separated into two layers, the upper layer, 20 ml., was largely nonane. The lower layer, 50 ml., was analyzed and found to contain, by weight, 80.2% DMAC, 0.5% acetic acid and the balance nonane.

The residual liquid remaining in the still pot was then distilled through the same column at a pressure of 54 mm. of mercury at a still pot temperature of 101° to 103° C. Four fractions of distillate were collected, and these were analyzed along with the residual liquid remaining in the still pot. Their compositions are:

| Fraction | Vapor temp., (° C.) | Volume (ml.) | Weight, percent ||
|---|---|---|---|---|
| | | | DMAC | Acetic acid |
| 1 | 92–94 | 25 | 92.6 | 1.0 |
| 2 | 94–95 | 50 | 94.1 | 1.4 |
| 3 | 95–97 | 50 | 95.3 | 3.2 |
| 4 | 95–97 | 30 | 90.9 | 8.8 |
| Still residue | | | 75.1 | 23.7 |

From the foregoing description, discussion and data, it is evident that this discovery constitutes a unique and effective method of resolving mixtures of DMAC and acetic acid into its components. While the invention has been described with certain details, it will be appreciated that changes from those details can be made without departing from its scope. For example, where essentially pure DMAC and acetic acid are desired, repeated distillations can be carried out or high efficiency equipment used, or both. Any pressure or degree of vacuum can be used to facilitate the distillation. Other changes can be made as will occur to the artisan.

What is claimed is:
1. A method comprising fractionally distilling a mixture consisting essentially of acetic acid, N,N-dimethylacetamide (DMAC) and a saturated aliphatic hydrocarbon containing at least six carbon atoms in its chain, to separate from said mixture a distillate composed essentially of acetic acid and said aliphatic hydrocarbon, and recovering DMAC from the distillation residue.
2. A method according to claim 1 in which the hydrocarbon contains a total of about 8 to 9 carbon atoms per molecule.
3. A method according to claim 1 in which the hydrocarbon is selected from the group consisting of n-octane, 2-methyloctane, n-nonane and 2,5-dimethylhexane.
4. A method comprising fractionally distilling a mixture consisting essentially of acetic acid, N,N-dimethylacetamide (DMAC) and a saturated aliphatic hydrocar- bon containing 8 to 9 carbon atoms per molecule, to separate from said mixture a distillate composed essentially of acetic acid and said hydrocarbon, cooling said distillate to form two liquid phases and recovering the resulting acetic acid phase, cooling the distillation residue to form a hydrocarbon phase and a DMAC enriched phase and recovering DMAC from said enriched phase.

5. A method according to claim 4 in which said hydrocarbon is selected from the group consisting of n-octane, 2-methyloctane, n-nonane and 2,5-dimethylhexane.

References Cited

UNITED STATES PATENTS

| 2,859,154 | 11/1958 | Othmer | 203—70 |
| 2,953,503 | 9/1960 | Freure | 203—67 |
| 3,144,396 | 8/1964 | Lynn et al. | 203—70 |

WILBUR L. BASCOMB, JR., *Primary Examiner.*

U.S. Cl. X.R.

260—541, 561; 203—73